May 26, 1959 T. G. HARE 2,888,236
VALVE SEAL
Filed June 29, 1956
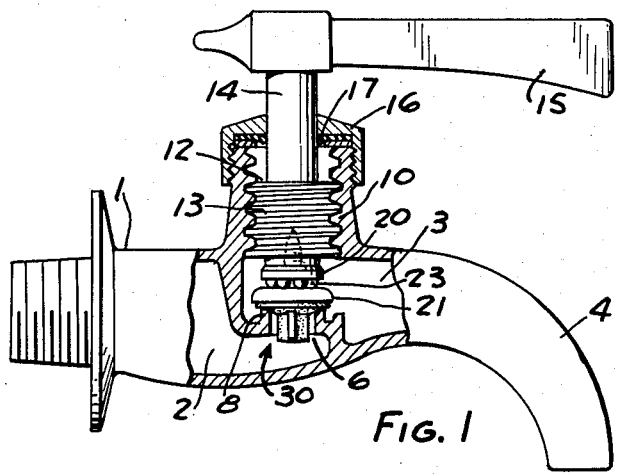
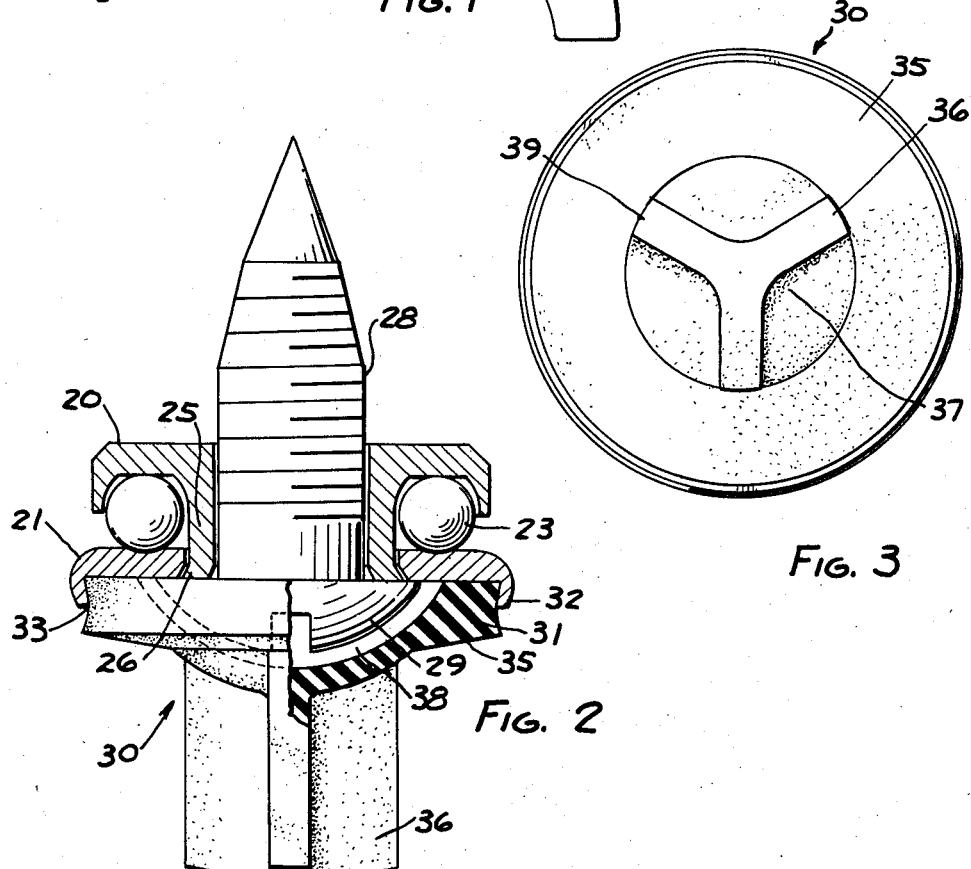
INVENTOR.
TERENCE G. HARE
BY
ATTORNEYS.

United States Patent Office 2,888,236
Patented May 26, 1959

2,888,236

VALVE SEAL

Terence G. Hare, Detroit, Mich.

Application June 29, 1956, Serial No. 594,799

3 Claims. (Cl. 251—88)

This invention relates to valves and has to do particularly with water faucets.

The invention is concerned particularly with a valve or faucet structure wherein the valve member is rotatably mounted on threads so that as it is turned it moves toward and away from a port or opening defined by a valve seat, the axis of which is substantially concentric with the axis of the threaded mounting. As the valve member is turned on its threads and advanced towards the seat, a sealing member carried by the valve member is caused to engage and press against the seat to thus close the port or opening and close the valve or faucet. The desirability of mounting the sealing member on the valve member so that it is rotatable or can turn relative to the valve member has long been appreciated so that when the rotating valve member urges the sealing member against the seat, there is no relative rotation between the sealing member and seat. Thus, wear due to the turning friction, which would otherwise take place between the sealing member and seat, is eliminated, resulting in long life of the sealing member. I have heretofore proposed and have developed valve and faucet structures where the sealing member was mounted on the valve member by means of an anti-friction bearing such as an annulus of balls.

In such a turnable anti-friction mounting of a sealing member, the structure and formation of the sealing member itself and the manner in which it is attached or applied to the anti-friction bearing mounting has presented a problem exceedingly difficult to solve. This invention accordingly aims to provide a ball bearing mounted seal structure for a valve or faucet and a sealing member which can be very easily installed merely by applying it with the fingers and which is so arranged that it is partially held and guided by the opening or port defined by the valve seat and, furthermore, which is held from displacement by the pressure and flow of the fluid which is controlled thereby.

Fig. 1 is a view partly in cross section illustrating a conventional form of faucet constructed in accordance with this invention.

Fig. 2 is an enlarged view partly in cross section showing the sealing unit which includes the anti-friction mounting and the sealing member.

Fig. 3 is a bottom view of the sealing member.

The structure shown in Fig. 1 is, of course, a valve but it is of the faucet type having a body 1 with an inlet passage 2 and an outlet passage 3 in a spout or spigot 4. A port 6 separates the inlet and outlet passages and the port 6 is defined by an annular valve seat 8.

The body has internal threads 10 and a valve member 12 has threads 13 in engagement with those of the body. The valve member has a stem 14 and a handle 15 and the stem extends through a cap 16 provided with a sealing member 17. Rotary motion of the valve member causes it to retract from and advance toward the valve seat depending upon the direction of rotation.

Secured to the end of the valve member is a structure for opening and closing the port 6. This structure is shown in Fig. 2. There is an upper race 20 and a lower race 21 and between the races is an annular array of ball bearings 23. The races are secured together by means of an axial hub portion 25 on the upper race, the end of which passes through a central opening in the lower race 21 and which is flared or fashioned upwardly into interlocking relationship with the lower race as shown at 26. This assembly of upper and lower races with the annular array of balls is secured to the stem by a screw 28, the body of which passes through the hub portion 25 and which is threaded into the valve member. The head 29 of the screw underlies the lower race and can be engaged by a suitable tool for applying it to the valve member. The screw 28 is advantageously of the self threading type.

The seal member is generally illustrated at 30 and it has a body 31 of disc form. This body is adapted to be applied to the lower race 21 by snapping or urging it into position. For this purpose the peripheral edge of the lower race 21 is provided with a flange 32. The flange is preferably annular and is shaped to provide or define a recess preferably slightly of reentrant form. That is to say, that the diameter of the recess measured at the under surface of the lower race 21 is greater than the diameter measured at the edge of the flange 32. The disc body 31 is of such a size that when it is in position the flange 32 grips and slightly compresses the material so that the peripheral edges of the disc body may appear slightly concave as at 33. This sealing member is made of a resilient material such as natural or synthetic rubber or a plastic substance having the requisite body and resiliency. The material is such that the sealing member retains its normal geometrical shape but can be flexed so that it can be engaged by the flange 32. A rubber or rubber-like substance commonly known as neoprene is an excellent example of the material which is satisfactory for the purpose.

The disc body 31 has an annular surface 35 for engaging the seat 8. The sealing member has a central portion which rises from the disc body thereof but the overall cross dimensions of which are less than that of the disc body so that the annular surface 35 is exposed. This projection is in the form of ribs 36 which extend from the disc body. As shown in Fig. 3 the projection has three of such ribs and the ribs define flutes or recesses 37. The disc body is formed with a concavity on its inner or underside as indicated at 38 to accommodate and provide clearance for the head 29 of the screw. The dimensions of the projection is such that the outer edges of the ribs 36, as indicated at 39, fit relatively nicely in the port 6 with a sliding engagement with the walls of the material which defines the port.

To make the assembly the anti-friction bearing subassembly is applied to the valve member with the seal member removed. Then, with the valve member removed from the body, the seal member 30 may be urged into position as shown in Fig. 2 with its disc body seated in the reentrant recess. The valve member may now be positioned in the body with the threads interengaging and the projection 30 is slidably received in the port 6. When the valve is closed the valve member is turned to bring the face 35 into engagement with the seat 8. When the valve is opened, the valve member is retracted to remove the surface 35 from the seat 8. However, the axial extent of the projection 30 is such that in all normal movements of the valve member the projection remains in the port 6. When the valve is opened the fluid may flow from passage 2 to passage 3 by flowing through the passages defined by the flutes or recesses 37. Should the valve be completely opened as far as the valve member can be retracted the projection still remains in the port.

Thus, no attaching means is necessary to change a sealing member or for that matter in the initial mounting thereof. The projection slides easily in the port 6 and thus at all times pilots or guides the sealing member and keeps it properly positioned and centered. Where the structure is used with water or other liquid the pressure thereof aids in keeping the seal member seated and offers no forces tending to unseat or displace the same. Indeed, the sealing member cannot well be displaced because it is at all times guided by the walls defining the port. It has been found by adequate tests while the port 6 is restricted to some extent by the piloting projection, there is no objectionable restriction, and adequate flow is provided for all normal purposes where faucets of this kind are employed.

The body of material in the central portion of the sealing member provides sufficient strength to prevent the concaved disc portion from collapsing under pressure into engagement with the screw head 29.

I claim:

1. For a valve or faucet having a body with an inlet passage and an outlet passage, a port defined by a circumferential seat positioned between the two passages, a valve member movable in said body axially of said seat, a seal-supporting member, means for rotatably mounting said seal-supporting member on the end of said valve member adjacent said seat comprising a screw passing axially through said seal-supporting member and having a head, a seal member on said seal-supporting member and comprising a disc like body member of resilient material having a central portion and an annular face surrounding said central portion and extending outwardly from the periphery thereof, said annular face being adapted to engage said seat, the central portion of said body member surrounded by said annular face providing a concave surface overlying but spaced slightly from the head of the screw, said central portion having a plurality of axially projecting ribs thereon and being sufficiently thin to flex and thereby permit sealing engagement of said annular face with said seat, said ribs providing reinforcements to said central portion to prevent collapse of said central portion into contact with the head of said screw.

2. The valve structure set forth in claim 1 wherein said central portion is of generally uniform thickness.

3. The valve structure set forth in claim 1 wherein said ribs extend radially of said central portion to said annular face.

References Cited in the file of this patent

UNITED STATES PATENTS

| 595,877 | Glauber | Dec. 21, 1897 |
| 1,913,381 | Grass | June 13, 1933 |
| 2,281,689 | Hare | May 5, 1942 |
| 2,368,887 | Schuler | Feb. 6, 1945 |
| 2,573,623 | Stover | Oct. 30, 1951 |
| 2,613,907 | Stillwagon | Oct. 14, 1952 |

FOREIGN PATENTS

| 510,398 | Great Britain | Aug. 1, 1939 |